Figure 1:
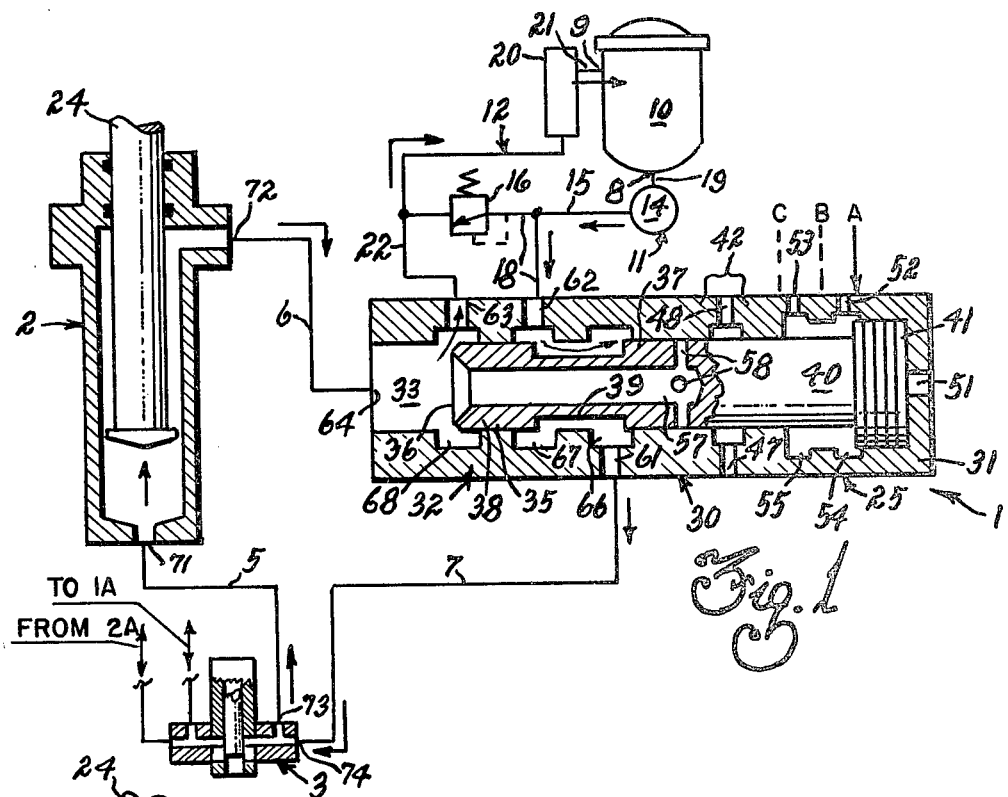

United States Patent [19]

Wisbey et al.

[11] 4,211,255

[45] Jul. 8, 1980

[54] SLIDE VALVE

[75] Inventors: Jerry D. Wisbey; Kirby L. Stone, both of Cincinnati, Ohio

[73] Assignee: Cincinnati Milacron Inc., Cincinnati, Ohio

[21] Appl. No.: 969,483

[22] Filed: Dec. 14, 1978

[51] Int. Cl.³ .......................................... F16K 31/124
[52] U.S. Cl. .................................. 137/625.48; 251/31; 137/563; 91/409; 60/468
[58] Field of Search .................... 137/625.66, 625.68, 137/625.48, 563; 251/31; 91/409; 60/468

[56] References Cited

U.S. PATENT DOCUMENTS

| | | | |
|---|---|---|---|
| 3,010,438 | 11/1961 | Fife et al. | 137/625.66 |
| 3,578,025 | 5/1971 | Furrer | 137/625.66 |
| 3,902,524 | 9/1975 | Stoltman | 137/625.68 X |

Primary Examiner—Arnold Rosenthal
Attorney, Agent, or Firm—Daniel P. Worth

[57] ABSTRACT

A slide valve has a spool valve element that is moved unidirectionally to a sequence of three positions during its operating cycle. The valve structure and unidirectional motion of the spool provide a precompression of the fluid being handled. The valve structure also permits relief of excess downstream pressure. Preferably hydraulic liquid is used to drive, position, and reset the spool valve. The spool valve itself has a hollow body with one groove on its outside surface and a valve body with a port at one end that is always in communication with the hollow portion of the spool valve. The slide valve is especially designed for and preferably used in a liquid reaction molding system to direct a reagent between a source (e.g. reservoir) and a destination (e.g. a mixing head). When applied to such a reaction molding system each slide valve replaces three conventional ball valves and one check valve and yet provides the additional features of precompression and relief of excess pressure.

14 Claims, 7 Drawing Figures

| CYCLE STEP | SPOOL POSITION | SOLENOID STATE * | |
|---|---|---|---|
| | | 81 | 82 |
| RECIRCULATE | A | DE | DE |
| COMPRESS MONOMER | B | E | E |
| INJECT | C | E | DE |

\* E = ENERGIZED
DE = DE-ENERGIZED

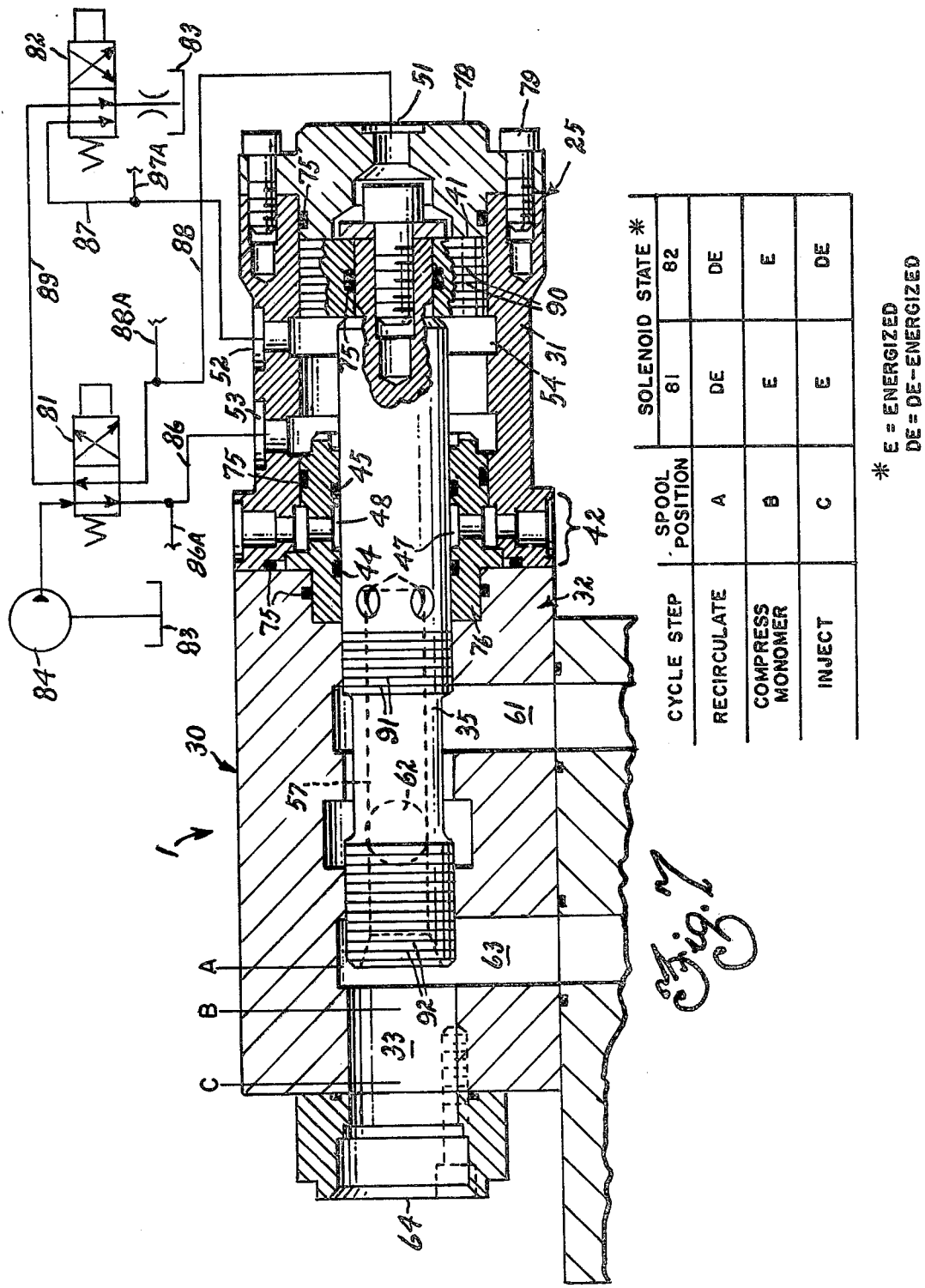

SLIDE VALVE

SUMMARY AND BACKGROUND

The present invention relates to a slide valve. One aspect relates to a slide valve as combined with components of a liquid reaction—or liquid injection—molding system. An aspect relates to a slide valve having a spool valve element and modus operandi featuring unidirectional spool movement, precompression of the fluid being controlled, and excess pressure relief means. The slide valve of the present invention is described with reference to a liquid reaction molding system.

Liquid reaction molding (LRM) and systems for practicing same are described, inter alia, in U.S. Pat. Nos. 3,908,862; 4,008,829; and 3,912,234. Very briefly LRM comprehends thoroughly mixing two liquid reagents that will react to form a solid plastic body and then, before it solidifies, injecting the mixture into a mold where it does solidify. Its advantages compared with conventional plastic injection molding include lower molding pressure, less energy required for molding, ready adaptability to large (e.g. automative body parts size) parts molding, and acceptably high production rates and quality (again, e.g., automotive body parts). The reagents must be carefully measured and thoroughly mixed to achieve the desired quality and rate of curing (i.e. solidifying) to which ends are directed, e.g., the systems of U.S. Pat. Nos. 3,908,862 and 4,008,829.

The LRM system of the enumerated patents for measuring and mixing of these references use three two-way ball valves and one check valve to accomplish directional flow control of each reagent. There being two reagents (normally), there are six ball valves and two check valves in such systems. The ball valves develop stem leakage problems during service with ordinary reagents. When the reagents contain fillers (which more and more they do in order to improve mechanical properties) such as mineral pigment, fiberglass, or carbon black, acute valve seat wear occurs, especially on the ball valves.

Spool type valves in LRM are known. German Auslegschrift 23 64 501 shows one such in detail. Spool valves in servo control systems with lands, grooves and hollow spools are known, e.g. U.S. Pat. to Vickers No. 1,928,144 and Tyler U.S. Pat. No. 2,655,903. The present invention and systems including it differ structurally and functionally, e.g. in the compression and pressure relief features.

The present invention contemplates a spool type or slide valve one of which replaces the three ball valves and one check valve in an LRM system while reducing the problems of stem leakage and seat wear. The instant spool type valve also provides means to precompress or prepressurize the reagent being controlled and also means to relieve excessive downstream pressure.

The preferred slide valve construction has a hollow spool with one groove between two lands for making and breaking (blocking) flow paths among four serially arranged ports that open into the valve chamber. The valve contemplates unidirectional movement of the spool to make and break fluid flow paths in a desired sequence. One end of the spool is free, the other end is connected to a hydraulic drive piston. One of the ports is at the far end of the valve chamber, where it is in constant full communication with the free end of the spool and the spool interior, which is the structure feature that achieves, both the precompression and relief features.

More specifically the invention embraces a reciprocating slide valve having a spool valve member that is slidably movable in one direction to or through three positions (first, intermediate; and injection, respectively) and comprising an elongated body having therein a bore constituting a valve chamber and a hollow spool valve slidably mounted in the bore. Drive means to unidirectionally move and position the spool valve at each of said positions in sequence. The body has first, second, third, and fourth valve chamber ports arranged serially in the wall of the chamber and progressing from one end to the other of the chamber. The spool has first and second lands spaced by a groove. The groove and first and second chamber ports are axially located and sized to connect the first and second chamber ports when the spool valve is in intermediate position and for the groove to be in communication with at least the second chamber port when said spool valve is in injection position. The spool second land establishes a communication path between the third and fourth chamber ports when the spool is in first position and blocks said path in the other two positions. The spool is hollowed by axially extending passage means extending between the lands for establishing communication when said spool valve is positioned at said injection position between the fourth chamber port and a predetermined one of said other chamber ports—normally the first port—but to block the last said communication at the other positions.

Figure 2:
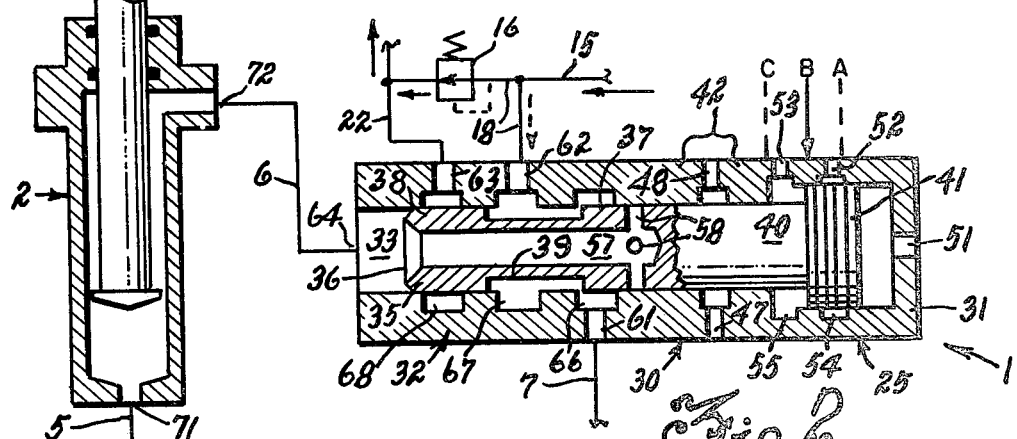
Figure 3:
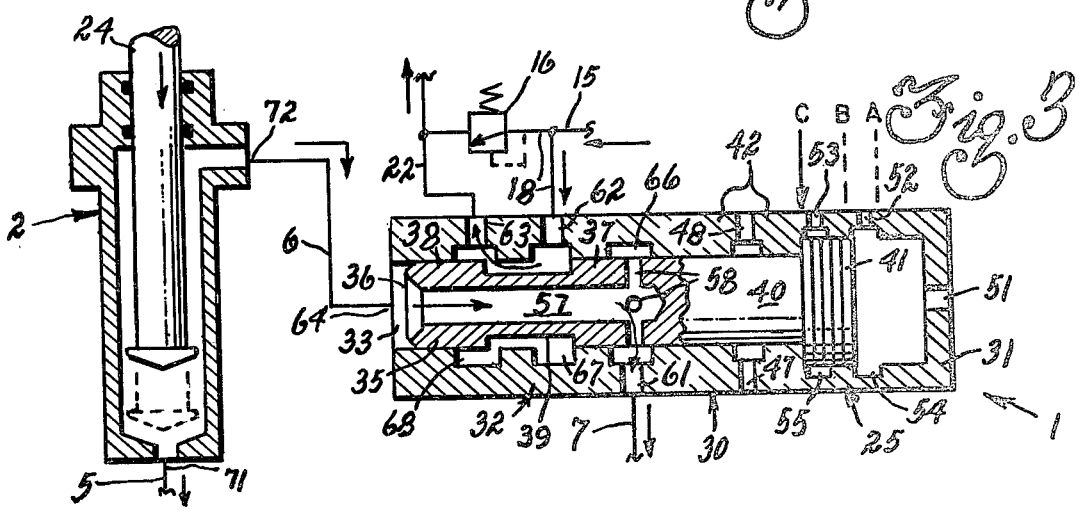
Figure 4:
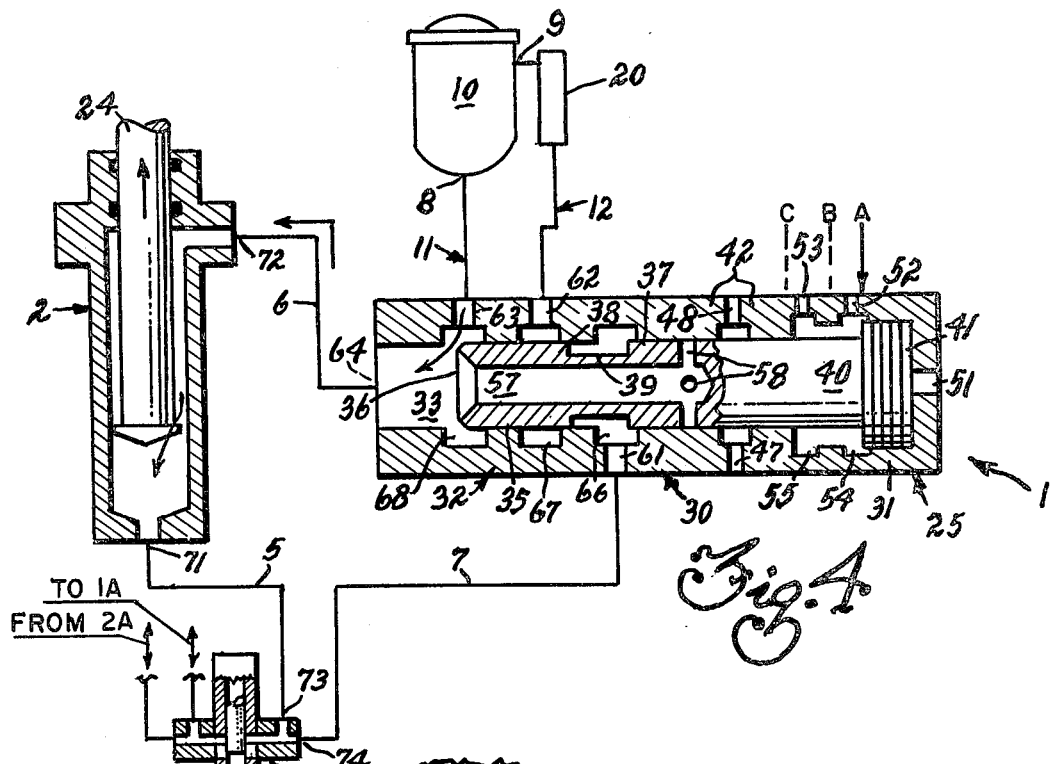
Figure 5:
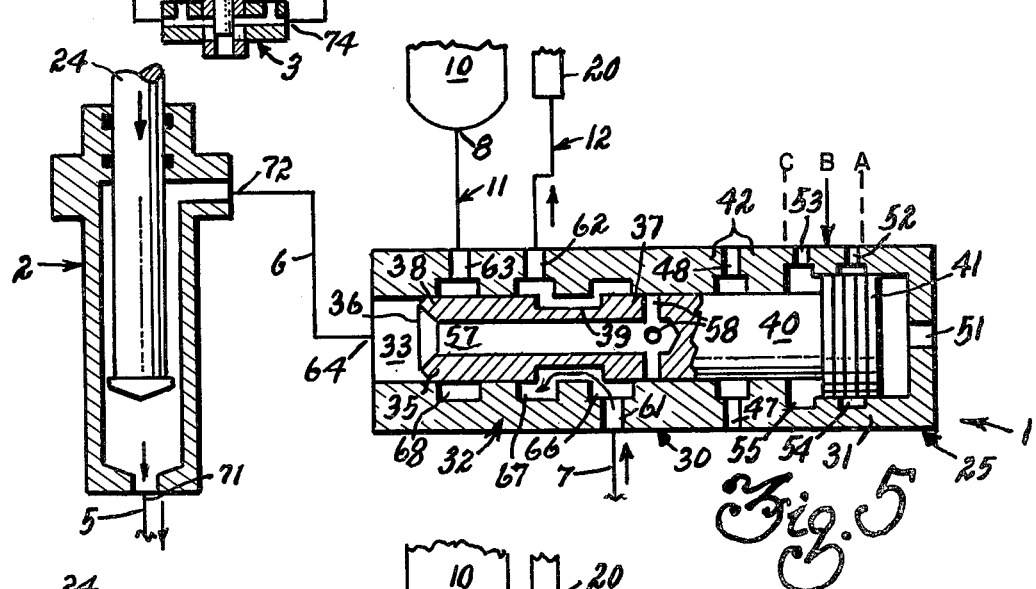
Figure 6:
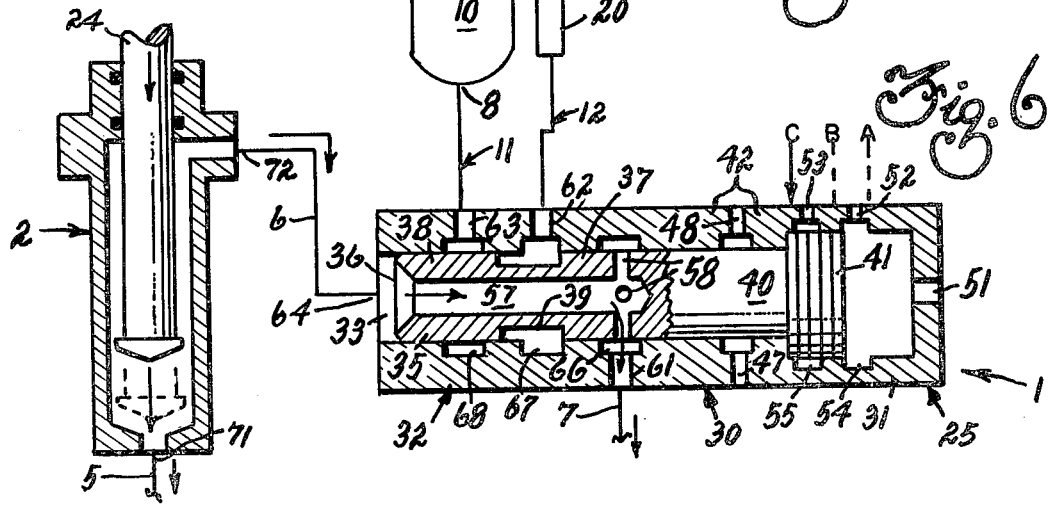

Other objects, advantages and features may be perceived from the following description together with the drawings wherein FIGS. 1, 2, 3 schematically illustrated a slide valve according to the invention, as applied in FIG. 1 to a circuit with a monomer pump in each of the following three positions, respectively: recirculation of the liquid from the mix head, intermediate or pressure building position, and injection (or high pressure) position;

FIGS. 4, 5 and 6 schematically illustrate a slide valve according to the invention, as applied in FIG. 4 to a piston pumping circuit (which does not have the monomer pump of FIGS. 1, 2, 3) in each of these three positions, respectively: cylinder filling or low pressure (metering pump on suction stroke), cylinder pumping or recirculation or intermediate pressure (both the metering pump plunger and spool valve advance); and the high pressure injection position; and FIG. 7 is a cross-section of a preferred construction of the slide valve of FIGS. 1, 2, 3 and a schematic of a control or solenoid valve system for operating same.

For a detailed description of the environment in which the present invention is applied, specific reference is made to U.S. Pat. No. 4,008,829 particularly FIG. 1 thereof which schematically illustrates an LRM system, which patent is expressly incorporated herein by reference. The slide valve of the present invention is applied to the '829 FIG. 1 system in lieu of the ball valve, check valve, and pressure relief valve illustrated therein for each monomer or more specifically, one slide valve of the present invention is used in lieu of the valve V1, V2, V101, and pressure release valve RV for one reagent and a like slide valve is applied in lieu of the valves V3, V4, V102 and pressure release valve RV for the other reagent as illustrated in '829 FIG. 1.

Referring now to FIGS. 1-6, we find the slide valve 1 connected in a circuit with a metering pump 2 and a mixhead 3 using first, second and third conduits 5, 6, 7 to interconnect these elements. Two middle ports of the valve 1 are connected respectively to the outlet (or second connection) 8 and inlet 9 (or reservoir first connection) of the reservoir 10 by first and second flow path means 11,12, respectively.

In the recirculation pump (pump) system of FIGS. 1-3, the first flow path means 11 also includes a constant volume monomer pump 14, a crossover connection 15 between the first and second flow path means having therein a pressure release valve 16 that is operated responsive to upstream pressure (i.e. to the pressure on the pump discharge), and conduits 18,19. The heat exchanger 20 to heat the reagent to the desired temperature is preferably included in the second flow path means 12 at a point immediately upstream of the reservoir inlet 9. Conduits 21,22 are included in the second flow path means.

The piston pumping system of FIGS. 4-6 differs from that just described in having no pump, no crossover, no pressure release valve and in requiring enough vertical elevation of the reservoir 10 above the other elements to assure a positive gravity feed from the first flow path means 11 into the system or, preferably, a reservoir pressurized with a gas such as nitrogen as described for the supplemental pressurizing source in patent '829. As will be explained below, the liquid is transferred by pumping the plunger 24 in the metering pump 2 in a manner coordinated with the slide valve.

As seen in all the Figs., the valve 1 of the invention is a reciprocating slide valve that is fluid driven by a fluid drive means 25 unidirectionally through a stroke of three sequential positions which are called the first (FIGS. 1 or 4), intermediate (FIGS. 2 or 5), and injection positions (FIGS. 3 or 6) or A, B, C, respectively. The initials A, B, C designate in FIGS. 1-6 the hydraulic piston positions with the solid arrow corresponding to the position shown and in FIG. 7 the same initials designate the corresponding spool positions.

The valve assembly 1 includes an elongated body assembly 30 having at one end a fluid drive cylinder 31 and at the other end a slide valve assembly 32 with a bore constituting a valve chamber 33. A spool valve 35 is slidably mounted in the bore 33 for movement among the three positions corresponding to A, B, C, and has a free end 36 and first and second lands 37,38 spaced apart by a groove 39. A drive shaft section 40 is between the free end and a hydraulic piston 41. The spool 35, drive shaft/seal 40, and piston 41 are of plain cylindrical shape.

The valve body 30 has a seal section 42 intermediate the drive cylinder and valve chamber. The seal section includes a pair of spaced apart O-rings 44,45 (FIG. 7) that sealingly engage the spool drive shaft section 40 and an inert buffer fluid (preferably dioctyl phthalate or DOP) inlet 47 and outlet 48. The fluid is circulated as explained in U.S. Pat. No. 3,912,234 for the purposes as explained therein.

The fluid drive cylinder 31 contains first, intermediate, and third fluid ports 51,52,53 through the body and in the walls of the cylinder. Actually, each port consists of an opening per se in the wall of the cylinder and a short passage through the wall of the chamber: for convenience the term port refers to both the opening per se and the short passageway. Preferably, ports 52,53 each open into a peripheral groove in the cylinder 54,55, respectively, in accordance with better hydraulic practice, so that improved fluid flow rates and characteristics are realized. Ports 51,52,53 admit or remove an exhaust or drive fluid (liquid, e.g. hydraulic oil, usually), respectively, to or from a first side of the piston 41, to a location intermediate the ends of said drive cylinder 31, and to the other side of said piston. Furthermore, the fluid drive piston 41 is spaced axially from the spool valve and in the hydraulic cylinder fluid ports are spaced from valve chamber ports axially (for reasons stated below) so that the piston is at the ends of the stroke in the first and injection positions A,C. The axial thickness of the piston 41 is preferably sufficient to block the intermediate fluid port 52 and groove 54 when at the intermediate position.

The spool 35 is hollow and has a bore 57 extending axially from the free end 36 of the spool into the first land where radial passages 58 connect bore 57 to the outer surface of first land 37. In other words, the spool valve is hollow and has an axially extending passage means 57,58 going from its free end to the first land.

The valve chamber 33 has first, second, third and fourth valve chamber ports 61,62,63,64 respectively, through the body wall and arranged serially in the walls of chamber 33 to progress, respectively, from the end of the valve chamber closest to seal section 42. The first port 61 is closest to seal section 42 and the fourth chamber port 64 is furtherest away therefrom. The first, second and third ports include the opening port per se in the valve chamber wall as well as the short passage from the port per se through the wall. Preferably, ports 61,62,63 open into respective peripheral grooves 66,67,68. The fourth valve chamber port 64 is preferably located centrally at the extreme end of the valve chamber in the fullest unrestricted direct communication with spool end 36 and spool bore 57.

The metering pump 2 and mixing head 3, respectively, have first and second connections 71,72 and 73,74. First conduit 5 connects the first connections of each 71,73 so that fluid (normally one of the LRM reagents) can flow between the metering pump 2 and the mix head 3. The second connection 72 of the metering pump is connected to the fourth port 64 of the spool valve chamber by second conduit 6. Third conduit 7 connects the first port 61 from the spool valve chamber to the second connection 74 on the mix head, likewise to establish a path for flow therebetween.

Referring to the spool valve 35 and valve chamber 33, the spacing of lands, grooves and ports must meet certain criteria for each of the embodiments to work properly. Both embodiments (FIGS. 1-3 and 4-6) require a spool groove 39 and first and second chamber ports 61,62 that are all axially located and sized to connect the first and second chamber ports by means of the groove when the spool valve is in the intermediate position (FIGS. 2 and 5) and to place the groove in communication with at least the second chamber port 62 when the spool valve is in the injection position.

The second land 38, generally speaking, must establish a communication path between the third and fourth chamber ports 63,64 when the spool valve is in first position A (FIGS. 1 and 4) and should block said communication path in the other two operating positions of the spool (FIGS. 2, 3 and FIGS. 5, 6, respectively). Furthermore, when the spool is in injection position C (FIGS. 3 and 6) the fourth valve chamber port 64 must be placed in communcation with the first valve chamber port by means of the axial passage means 57,58 in the hollow spool (the passage being a combination of the axial bore 57 and radial holes 58).

There are some differences in what the spool valve and coacting valve ports do in the two embodiments. For example, the recirculation pump system of FIGS. 1-3 requires a spool groove 39 axial width sufficient to connect the first and second chamber ports when the spool is in first position A (FIG. 1) so that the monomer pump 14 will pump fluid to the mix head through a path that includes in series the second and first chamber ports 62,61 and the third conduit 7. At the same time, however, the FIGS. 1-3 embodiment requires that the third and fourth chamber ports 63,64 communicate with each other, hence second land 38 has to be short enough (i.e. axially wide enough) to permit this. The embodiment of FIGS. 4, 5 and 6 differ in (assuming the same valve body and interchangeable spool or alternatively same spool with different port spacing in the valve chamber) requires second land 38 length or axial dimension such that in the first (or FIG. 4 cylinder filling) position A places third and fourth chamber ports 63,64 in communication while closing off flow between ports 61,62. However, as seen in FIG. 5, second land 38 when at intermediate B closes off the third-fourth port communication at the same that groove 39 establishes first-second port communication, the groove width being narrower than in the FIGS. 1-3 embodiment (assuming the same slide valve body assembly 30 is used with interchangeable spools for the two illustrated embodiments).

The groove width and chamber porting of the two embodiments in the injection position is also significantly different. Communication between the second and third ports 62,63 is deliberately established in injection position C for the recirculation system of FIG. 3. However, the spool groove width and second-third port spacing for the piston pumping system of FIG. 3 requires at C that second-third port communication be interrupted by the second land. The FIG. 3 injection system thus provides a flow path from the monomer pump 14 through the second and third chamber ports 62,63 and a return to the reservoir 10. As an alternative, the pump 14 may be run at a higher pressure to discharge through the pressure relief valve 16. The FIGS. 4, 5, 6 embodiment does not have to dispose of the discharge from a pump, hence operates differently.

It has been observed that the system of FIGS. 1-3—in which pump 14 continuously operates—operates easier with less pump power consumption because it affords the second-third port flow path around the pressure release valve: were it not in existence, the pump would have to build up a higher discharge pressure in order to discharge through the pressure release valve thence to the reservoir.

FIG. 7 illustrates in cross-section one embodiment of the instant slide valve together with a schematic diagram and the following operating table of the control valve system which operates and positions the spool valve to achieve the desired fluid flow objectives: The seal section 42 comprises a flanged bushing 76 which is clamped between the drive cylinder 31 and valve chamber housing 32 in coaxial alignment with both. This assembly makes up most of the body assembly 30. The remainder of the valve body includes a drive cylinder head 78 in which the first drive port 51 is centrally located and which is held in place by conventional means such as a plurality of bolts 79 which pass through the flanged corners provided where two parts come together as shown in U.S. Pat. No. 3,101,738 and as standard on hydraulic fittings (visualize a cylinder with square plates on its ends: the bolts go through the corners of the plates and do not interfere with the cylinder in which is the spool or hydraulic piston). The valve body also includes a plurality of sealing means such as the well-known O-rings, a pair of which, 44,45, are spaced one on each side of the solvent ports. Other O-rings 75 are located at suitable places in recesses to achieve the desired sealing functions.

The schematic solenoid valve system for directing hydraulic liquid into the drive cylinder (FIG. 7) includes first and second four-way hydraulic valves 81,82, a hydraulic reservoir 83, hydraulic pump 84, and a variety of duct means 86 through 89 that interconnect the pump, solenoid valve and first, second and third drive chamber ports 51,52,53. Pressure equalizing grooves 90,91,92 are provided as desired on the first and second lands and piston.

It is the purpose of the FIG. 7 control system to hydraulically position the spool at its three positions sequentially and by a unidirectional motion of the spool—drive shaft—piston combination. This may be done by manual operation but preferably is programmed into a suitable sequencing device—such as a microprocessor. See, e.g. the referenced patents. The system is illustrated electrically dead, with both solenoid valves 81,82 deenergized in which case the piston 41 and spool valve 35 are moved to the first (extreme right hand) position A as shown in FIGS. 1, 4 and 7 in which case pressurized hydraulic liquid is supplied to the drive cylinder 31 through port 53 and exhaust fluid travels from port 51 to the first solenoid and thence to tank through the second solenoid valve. Intermediate position B of the spool valve—FIGS. 2 and 5—occurs by energizing both solenoids of valves 81,82—thus pressurized hydraulic fluid is supplied from the pump 84 through the first solenoid 81 to the full face of the piston 41 through the hydraulic port 51. This moves piston 41 to the left, forcing some liquid to exhaust via port 52, line 87 and valve 82 and stopping when port 52 (or groove 54) is blocked and liquid cannot leave. And finally, injection C is achieved by deenergizing second solenoid 82 whereupon an exhaust passage is established from drive port 53 through both solenoids to tank and the intermediate port is blocked.

The embodiment of FIGS. 1, 2 and 3 contemplates a constantly operating monomer pump 14 and, necessarily, some way to dispose of the discharge from the pump. Of course, the position of the valve assembly 32 must be coordinated with other elements of the system as is further explained in my above reference and incorporated patents. In FIG. 1, for example, the pump is operating constantly and its discharge flows to the mixhead 3 and is recirculated through the system back to the reservoir and the pump. By so doing, the entire system is maintained filled with the fluid being pumped, hence the term recirculation position for first position A.

FIG. 2 illustrates intermediate position B which is realized between recirculation and the injection positions A,C. Operations for B first include advancing the solenoid valves 81,82 to advance the spool to the FIG. 2 position. Plunger 24 stays in place during this step. This connects the monomer pump 14 discharge to a loop that includes the first, second and third conduits 5,6,7 the metering pump 2, mixheads 3, and spool valve 32 so that it builds up a pressure in the loop, the pressure relief valve 16 determining when that pressure has been reached.

During injection position C of FIG. 3, the solenoid valves 81,82 are manipulated as described above to move the spool to C after which other controls initiate (per patent '829) the advancement of the metering pump plunger 24 through its stroke and opening of the mixhead 3. The spool position of FIG. 3 provides two paths from the metering pump 2 to the mixhead (6-57-7-74 and 71-5-73) thus permitting use of smaller inside diameter pipe tubing or hoses, reducing pressure drop, and/or speeding up injection.

It has been observed that the spool valve of the present invention contributes materially to a major improvement in building pressure during C. For example, one set of measurements on a laboratory unit using rigid pipe and tubing connections demonstrate that one spool valve (1.375" spool outer diameter) displaced approximately 1.5 cubic inches in its motion (1 inch stroke) to the FIG. 3 position using a liquid reagent with no added gas and while all other elements are held in place (i.e. no metering pump plunger advancement) and resulted in a 300 psig. pressure increase. (Molding practice often adds gas to the liquid as a nucleating and/or foaming agent hence making the liquid compressible and uses flexible lines in many parts of the system which would result in a lesser pressure increase). The 300 psig. increase represents a substantial portion of the normal 1800–2000 psig. desired for injection.

The embodiment of FIGS. 4, 5, and 6 has a system which eliminates the pump 14 and pressure valve 16 of the other embodiment and relies upon a coordinated operation of the metering pump plunger and the spool valve to achieve the requisite pumping and injection actions. In the FIG. 4 position, the spool is pushed to far right by the hydraulic system (FIG. 7) and thus permits flow (by gravity or under gas pressurized reservoir) of heated liquid from the reservoir 10.

The embodiment of FIGS. 4, 5 and 6 has two modes of operation each involving two of the steps in the three Figs. One mode is for a cycle ending in injection and involves only the position of FIGS. 4 and 6 (injection mode). Another mode involves idling or dry cycling and involves the positions of FIGS. 4 and 5 (idle mode). Frequently, in automatically cycled systems (e.g. U.S. Pat. No. 4,090,695) the overall injection system may require more time between injections (shots) than is pre-selected for the cycle time of the slide valve 1 and it is desired to cycle the valve so that it does not shoot (i.e. inject). Such occurs when one or more of the reagents contains a solid filler (e.g. glass fibers, mineral pigments, microspheres) and idle cycling is desired to keep the liquid reagent in motion to prevent the solids from settling out. Sometimes, too, idling is desirable to assure that the system remains liquid filled and does not loose pressure. For example, extra time between shots and possibly extra injection cycles per shot could be required in the system of cited U.S. Pat. No. 4,090,695 which has multiple molds and mixheads 3 served by one set of metering pumps 2, hence by one slide valve 1 per pump: such variation among the several mixheads could, e.g., require an extra injection cycle (FIGS. 4, 6 and reset to FIG. 4) for very large molds and/or one or more idle cycles (FIGS. 4, 5 reset to FIG. 4) for long time intervals between shots, as when changing to other molds or stopping all shots during downtime.

In the injection mode of FIGS. 4 and 6, the spool is first moved to position A and warm pressurized liquid flows out of reservoir 10 through ports 63,64 into the system after which plunger 24 is retracted. No flow occurs back into reservoir 10 via ports 61,62 during this position. Then the solenoids are moved to the inject position (FIG. 7), the spool moves rapidly to C or FIG. 6, after which the plunger 24 is started to advance to prepressurize the system. When the system reaches injection pressure (e.g. as in '829) the mixhead 3 opens, plunger 24 continues to advance and the injection or shot occurs. At the end of the shot these steps occur in reverse order to reset, i.e.: mixhead 3 closes, plunger 24 stops advancing, the spool moves to the FIG. 4 position, and the plunger is retracted as in FIG. 4.

In the idle mode of FIGS. 4, 5 the valve is first positioned at A as in FIG. 4 and liquid reagent flows into the system via ports 63,64 as already described. Then the plunger 24 is retracted (arrow 24 FIG. 4). When 24 reaches its most retracted position the system is full of liquid, the intake or suction is completed and the sequence of FIG. 5 is started, viz., the valve 1 is first moved to B and cuts off flow between ports 63,64 but establishes a flow betweem ports 61,62. After the valve is at B a pumping stroke of plunger 24 commences and pressure builds up and/or liquid is forced to flow in the loop 71-5-73-74-7-61-62-12. The system is reset after the plunger 24 finishes its FIG. 5 stroke by first returning valve 1 to its FIG. 4 position, then retracting the plunger 24.

In each step (i.e. FIGS. 1–6) of all embodiments the valve 1 is positioned first and the plunger 24 is moved thereafter. The system may be operated manually but typically and preferably is operated automatically from a program stored in a microprocessor or programmable controller and most preferably its operation is integrated with the programs of U.S. Pat. Nos. 3,908,862 and 4,008,829 (cited above) and 4,090,695.

In the hydraulic and solenoid valve system of FIG. 7 are shown conduits 86A,87A and 88A which extend from their respective connections to conduits 86,87 and 88 to first, second, and third hydraulic ports 51A,52A,53A respectively, on another similar, preferably identical, slide valve 1A (not shown but built like slide valve 1: postscript A designates elements of the nonillustrated system). Such connections allow both slide valves 1,1A to operate simultaneously in response to actuation of the solenoid valves, thus to simultaneously control feed of their respective liquids to the mixhead 3 in liquid flow control systems which each include—a metering pump 2,2A as well as a slide valve 1,1A. The conduits 4A and 7A (FIGS. 1,4) connect their slide valve 1A and pump 2A in a loop with mixhead 3 in like manner and for the same reasons as described above for their numerical counterparts.

In summary, it will be seen that the present invention provides a unique use and construction of a slide valve and of a system that incorporates the valve for liquid mixing, e.g. as in the above-mentioned patents. The cooperation achieved by the instant valve with the reset of the system provides for an enhanced compression or precompression in the intermediate position or step and also provides an unusual pressure release feature in the injection position of the embodiment: an overpressure in the valve chamber 33 during injection, if severe enough, overcomes the hydraulic liquid pressure (e.g. between port 51 and piston 41, FIGS. 3,6) and forces the spool valve 35 to the right thereby opening an exhaust line 12 through port 63.

What is claimed is:

1. A reciprocating slide valve having a spool valve member that is slidably movable among at least three positions (first, intermediate, and injection, respectively) and comprising an elongated body having therein a bore constituting a valve chamber;

a spool valve slidably mounted in said bore for reciprocating among said three positions;

drive means to move and position said spool valve at selected ones of said positions;

first, second, third, and fourth valve chamber ports through said body and arranged serially in the walls of said chamber progressing from one end to the other of said chamber;

first and second lands spaced by a groove on said spool valve; said groove and first and second chamber ports being axially located and sized to connect said first and second chamber ports when said spool valve is in said intermediate position and to be in communication with at least said second chamber port when said spool valve is in said injection position; said second land establishing a communication path between said third and fourth chamber ports when said spool valve is in said first position and blocking said path in the other two positions; and axially extending passage means in said spool valve body extending between said lands for establishing communication when said spool valve is positioned at said injection position between said fourth chamber port and a predetermined one of said other chamber ports but to block the last said communication at the other position.

2. A slide valve according to claim 1 wherein said drive means includes a hydraulic fluid control system comprising first and second four-way hydraulic valves; and duct means interconnecting said valves and said drive means to establish—when both four-way valves are in a first state—a flow path through said first four-way valve for pressurized fluid to said drive means and an exhaust flow path from said drive means through both four-way valves, and to establish—when both four-way valves are in a second state—a flow path for pressure fluid to said drive means through said first four-way valve and an exhaust path from said intermediate fluid port through said second four-way valve.

3. A slide valve according to claim 1 wherein said groove is axially sized to establish communication between said second and third chamber ports when in said injection position.

4. A slide valve according to claim 1 wherein said groove is axially sized to establish communication with said second port as aforesaid and said second land, while the spool in said injection position, blocks all flow paths between said third flow port and any of the others.

5. In a liquid flow control system for controlling the flow of a liquid to a mix head, which system includes a metering pump and mixing head, each having first and second connections, the further improvement comprising a slide valve in accordance with any one of claims 1, 2, 3, or 4;

a first conduit connecting the respective said first connections of said mix head and metering pump;

a second conduit connection between said slide valve fourth port and said metering pump second connection;

a third conduit connection between said slide valve first port and said mix head second connection;

said spool axial passage establishing communication between said fourth and first ports in the injection position;

whereby pressure of liquid in the system between said first and fourth ports that includes said first, second, and third conduit means, said mixhead and said metering pump increases responsive to said spool being moved from said first through said intermediate positions.

6. In a liquid flow control system according to claim 5 which further includes a reservoir and a pump connected to an outlet from said reservoir, the improvement that comprises first and second means for establishing flow paths between said reservoir and, respectively, said second and third slide valve ports (first and second flow path means); and said pump being interposed in one of said first and second flow path means; and a pressure relief means connected on the discharge side of said pump and between said first and second flow path means.

7. In a liquid flow control system according to claim 5 which further includes a reservoir, the improvement that comprises first and second means for establishing flow paths between said reservoir and, respectively, said second and third slide valve ports (first and second flow path means); and said spool groove and second land interrupt communication between said second and third slide valve ports in said injection position.

8. In a liquid flow control system according to claim 5 which further includes a reservoir and a pump that comprises first and second means for establishing flow paths; and said spool groove when said valve is in said injection position establishes communication between said second and third slide valve ports.

9. In a liquid flow control system according to claim 5 which further includes a reservoir and a pump that comprises first and second means for establishing flow paths;

said reservoir having an inlet and an outlet;

said first and second flow path means being connected to said outlet and said inlet, respectively; and a pressure relief means connected between said first and second flow path means to permit flow from said outlet through said first flow path means to said second flow path means responsive to pressure in said first flow path means exceeding a predetermined level.

10. A reciprocating piston valve that is fluid driven unidirectionally through a stroke and sequentially through at least three positions (first, intermediate, and injection, respectively) and comprising an elongated body having at one end a fluid drive cylinder and at the other end a bore constituting a valve chamber;

a spool valve reciprocably mounted in said bore for movement among said three positions;

a fluid drive piston connected to one end of said spool valve and slidably mounted in said fluid drive cylinder;

first, intermediate, and third fluid ports through said body and in the walls of said cylinder arranged to admit drive fluid respectively to a first side of said piston, to a location intermediate the end of said cylinder, ends of said drive cylinder, and to the other side of said piston;

first, second, third and fourth valve chamber ports through said body and arranged serially in the walls of said chamber progressing from one end to the other of said chamber with said fourth chamber port disposed further away from said fluid drive cylinder than the other chamber ports;

first and second lands spaced by a groove on said spool valve; said groove being axially located and sized to connect said first and second chamber ports when said spool valve is in said first and intermediate positions and to connect said second and third chamber ports when said spool valve is in said injection position; said second land establishing a communication path between said third and fourth chamber ports when said spool valve is in said first position and blocking said path in the other two positions;

said fluid drive piston being spaced axially from said spool valve to be at the ends of the stroke in said first and injection positions and of an axial size sufficient to block said intermediate fluid port when at said intermediate position; and passage means in said spool valve for establishing communication when said spool valve is positioned at said injection position between said fourth chamber port and a predetermined one of said other chamber ports but to block the last-said communication at the other positions.

11. A piston valve according to claim 10 wherein said passage means comprises in said spool an axial bore extending from that end of said spool closest to said body other end and radially to an exit port at a location on said first land that establishes communication between said fourth and first chamber ports when said spool is in said injection position.

12. A reciprocating piston valve according to claim 10 combined with a hydraulic fluid control system comprising first and second four-way hydraulic valves; and duct means interconnecting said valves and said first, second, and third hydraulic fluid ports to establish—when both four-way valves are in a first state—a flow path through first four-way valve for pressurized fluid to said third hydraulic flow port and an exhaust flow path through both four-way valves, and to establish—when both four-way valves are in a second state—a flow path for pressure fluid to said first hydraulic fluid port through said first four-way valve and an exhaust path from said intermediate fluid port through said second four-way valve.

13. A slide valve according to claim 3 further comprising said drive means being to unidirectionally move said spool valve from said first position to only one other of said positions and to position it there.

14. A slide valve according to claim 1 further comprising said drive means being to unidirectionally move said spool valve from said first position to each of said positions in sequence, positioning said spool valve at each position when it arrives there.

* * * * *